Feb. 25, 1936. H. ROSENBERG 2,032,099
FASTENER AND ART OF PRODUCING SAME
Filed March 3, 1932

Inventor:
HEYMAN ROSENBERG
By Edgar M Kitchin
his Attorney

Patented Feb. 25, 1936

2,032,099

UNITED STATES PATENT OFFICE 2,032,099

FASTENER AND ART OF PRODUCING SAME

Heyman Rosenberg, New York, N. Y.

Application March 3, 1932, Serial No. 596,637

8 Claims. (Cl. 10—161)

This invention relates to improvements in that type of fastener which has come to be known as water-proof or leak-proof, and it has heretofore been proposed to prevent leakage between parts of a nail or like fastener and parts of a metal sheet penetrated by the fastener by the provision of a lead or like soft metal head or cap or washer for the fastener.

In the previously proposed devices, however, in which a washer is mounted on the shank of a nail beneath its head, or the head of a nail is encased in lead either cast or die-stamped, difficulty has been experienced in the successful use for the purpose intended and a substantial expense has been involved from the tendency of the lead to form fissures and separate from contacted parts and from excessive quantities of lead required in such previously proposed devices.

It is the essential object of the present invention to materially reduce the expense of production and to eliminate the mentioned difficulties and defects in operation.

In the previously proposed constructions in which a lead washer or a lead casing for the head of a nail or like fastener was provided with the object of rendering the joint between the head and the sheet metal engaged thereby moisture-proof, defective results have occurred from cracking of the lead or the curling of the lead to a cupped condition and a failure of the lead, whether die-stamped, molded, or merely applied in the form of a washer, to sufficiently intimately engage the surfaces of the nail to preclude moisture leakage between the lead and such surfaces.

A more detailed object of the present invention is the elimination of the possibility of leakage between a highly malleable area of material and the main stock of the fastener.

With these and further objects in view as will hereinafter in part become apparent and in part be stated, the invention comprises certain novel constructions, combinations, and arrangements of parts as subsequently specified and claimed.

The invention also comprises certain novel steps and combinations of steps in the art of producing fasteners for rendering the same leak-proof inexpensively and effectively.

In the accompanying drawing,—

Figure 2:
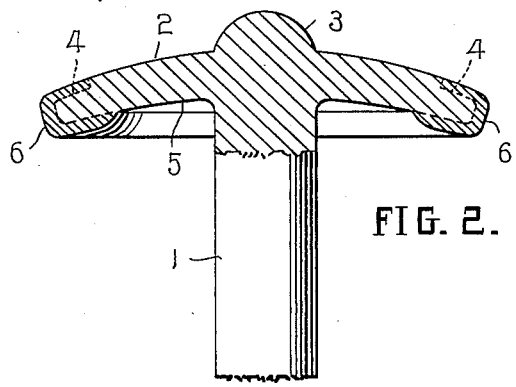
Figure 2 is a similar view of the same in its completed condition.

Figures 3, 4, 5, and 6 are respectively views similar to Figure 2 of slightly modified embodiments.

Figure 3:
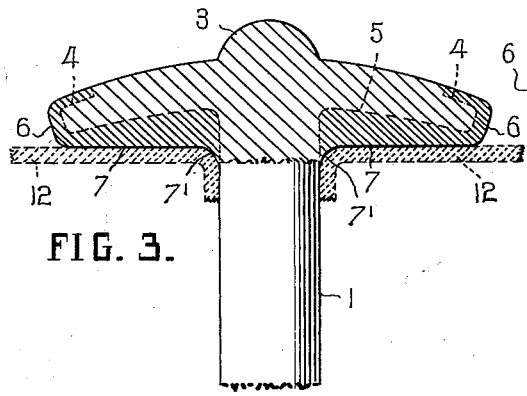
Figure 7:
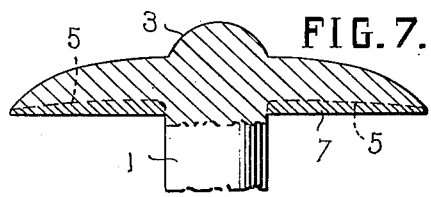

Figure 7 is a view similar to Figure 3 with the upper marginal covering omitted.

It will be readily understood by those familiar with the art to which the present invention relates that cornices, metal roofing, metallic box coverings, and like weather-shedding coverings have heretofore been anchored by various means, such as the driving of nails through parts of the metal cover sheet into wooden supports below and subsequently soldering the head of the nails to the penetrated sheet, and while this usually makes a very acceptable anchorage and leak-proof joint, the necessary hand operations are both laborious and expensive, and it, therefore, has been proposed to substitute lead or like soft metal in loose form already applied to the fastener in the hope and expectation of causing such intimate contact incident to the pressure under which the fastener is applied as to preclude leakage. Such fasteners, of course, have included the ordinary hammer-driven wire nails and like fasteners whether actually hammer-driven or otherwise stressed into the finally seated position, and though the accompanying drawing illustrates the invention as particularly applied to nails, drive screws, and wood screws, it should be understood that the invention is as well applicable to the head of other fasteners however subjected to pressure for seating purposes in the finally anchored position.

Since much of the defects of previously proposed anchorage devices utilizing an interposed soft metal between the fastener head and the sheet engaged have been due to lack of effective contact either between the soft metal and the sheet or between the soft metal and the head or other engaged part of the fastener, and since such lack of effective contact has arisen either from the initial loose condition of the lead relative to the head of the fastener or the loosening thereof from the fastener, as by splitting, cracking, or other defect developed under hammer blows or under differential contraction and expansion with climatic temperature variations, the present invention includes provision against possibility of any such defects.

In the practicing of the present improved art for the production of the present improved fastener head, it is possible to employ a commercial nail, screw, or other well known fastener already in use or on the market, but I prefer to utilize an especially shaped fastener head adapted particularly for enhancing the value of the present invention. To this end, and referring more particularly to Figures 1 and 2 of the drawing, 1 indicates the shank of a fastener which ordinarily would be considered a nail but may be a wire or other fastener provided with an anchoring head 2. When the fastener 1 is a nail, the head 2 is preferably provided with a bulbous enlargement 3 especially adapted to receive hammer blows, but it will be readily understood that the bulbous enlargement 3 may be omitted. The head 2 may be of any of various proportions and contours, but preferably is concavo-convex or umbrella-shaped, and the peripheral portion of the head 2 is preferably provided with a circumferential rabbet 4. The concavo-convex head for nails is known commercially, but I am unaware of any previous attempt or suggestion to provide a rabbet corresponding to the rabbet 4. The head 2, owing to its contour, provides an inner space 5 insuring effective contact of peripheral portions of the head against the engaged sheet, and space 5 may either be left as a space or be filled with lead.

In the practicing of the art forming part of the present invention, the fastener 1 is of iron or other appropriate metal and is subjected to an initial step of coating, as by applying zinc or lead, or other appropriate metal, preferably by way of the electrolytic bath or the hot galvanizing of metal. The coating must not be merely superficial but applied in a manner, as by hot galvanizing, to insure penetration of the pores of the metal of the fastener so as to become commingled and interlocked with and in the fiber of the metal of the fastener as by the flowing of molten metal into the pores of the material of the fastener so as to approach a condition homogeneous therewith. Thus, there is provided in the material of the fastener, about the engaged surface thereof, a mixed, mingled or blended area of lead or zinc or other soft metal with the iron or steel or other appropriate metal of the fastener. Of course, while the whole fastener 1 is usually thus coated, it should be understood that so far as the present invention is concerned, it is essential only that the coating be applied to those portions of the fastener to be supplied with the lead or other soft metal cushion or covering.

As a matter of facility of procedure, the fastener with its head 2 thus coated is preferably allowed to cool and is either dried in a drying machine or otherwise preceding the next step in the process. It is, of course, possible to employ fasteners already on the market if properly galvanized or otherwise satisfactorily coated so that the coating includes an area of softer metal mingled or blended with the harder metal of the fastener.

The head 2 and particularly the parts thereof to receive the lead or like soft metal pad or coating is then supplied with a flux preferably by having the flux sprayed thereon, and then those parts of the head 2 to receive the lead covering are dipped into a molten lead bath, removed therefrom, and afforded an opportunity for draining. However coated, the head is preferably revolved during the draining operation to afford uniformity of distribution of the lead clinging to the head, but the rotation is never fast enough to endanger centrifugal loss of lead. The apparatus employed for carrying out the steps stated is susceptible of an almost unlimited range of variations including apparatus for bodily moving the margins of the head 2 into and out of a circular molten bath proportioned to receive only the parts to be lead-coated. Or a molten lead bath receptacle may be provided having a margin which the head of the fastener may overlie and along which the fastener may be rolled with a sector of the edge of the head submerged in the molten bath and the sector constantly advanced by the rolling movement of the head. The rolling operation is preferably continued beyond the bath, as by movement along an upwardly-inclined margin of the receptacle to a point where the head is entirely out of the bath. The result of the operation will be to place a covering or cushion of lead about the periphery of the head 2, substantially as seen in Figure 2, and while the showing in Figure 2 is necessarily somewhat idealized, the result will be found to be substantially uniform with a covering of lead or like soft metal filling the rabbet 4 and extending about the periphery and for a short distance beneath the under surface of the head 2, producing an encasing ring or gasket 6 possessing the peculiarity that it is not merely applied to or superimposed on the head 1, but is actually integral with the head so as to be homogeneous with the first coating and blended with the material of the fastener and form part of the head. It should also be understood that this sweating of the gasket 6 into integral relation with the main part of the head 2 may be accomplished by other modes of procedure than those above specifically stated, as by die-stamping a cold gasket to the periphery of a previously properly prepared fastener head, (say hot galvanized and supplied with a flux) and then subjecting the parts to electric current of sufficient amperage to produce the equivalent of spot-welding.

In Figure 3, the structure incorporates all of the features of Figure 2 including the body 1 and head 2 with its enlargement 3 and rabbet 4, and having the ring or gasket 6 of lead or like soft metal encircling the periphery of the head and filling the rabbet; and, in addition to these details, the structure of Figure 3 provides for an increase in the area of the cushioning bearing against the sheet engaged by the fastener. To this end, the lead is extended inward toward the body 1 from gasket 6 to fill the space 5 and to homogeneity with the initial coating and blended with the body 1 for a short distance of its length, thus providing a filler 7 for the space 5 which is preferably brought to a cone frustum about body 1, and thus providing a tapering or curved fillet 7'. When the fastener 1 is driven through a sheet of metal, such as indicated in dotted lines at 12 in Figure 3, the opening thus formed in the sheet is surrounded by a burr pressed to an outstanding position by the movement of the entering end of body 1 through the sheet, but usually and almost invariably the surrounding material of sheet 12 immediately contiguous to body 1 and above the burr is curved downward in blending with the burr so as to produce a hollow cone frustum of relatively short length, and the cone frustum fillet 7' is proportioned to snugly fill this hollow conical space of sheet 12. When the fastener 1 is a nail, and the nail is driven to the position seen in Figure 3, the cushion or lead overlay 7 is not only brought to a snug relationship with respect to the sheet 12, but as the sheet 12 is usually supported on a relatively rigid timber or other base, the resistance of the sheet to further movement of the nail inward under a hammer blow will cause the metal 7 to flow outward in all directions toward the periphery of the head and thus to fill any slight irregularities at various points between the place of penetration of sheet 12 and the outer periphery of the head.

The structure seen in Figure 3 may be produced in any of various ways, one inexpensive and acceptable mode consisting of first providing the hot galvanized or similar initial coat intermingled with the fiber of the fastener, then supplying a flux to the parts of the head and parts of body 1 to receive the lead, and then dipping the fastener (with the head downward) into a molten bath of lead and lifting the fastener bodily out of the bath, and then moving it laterally away from the bath while wiping the then under face of the head, which is, of course, the hammer-blow receiving face of the head. This wiping action is to remove excess clinging lead so that no second coating or no appreciable portion of the second-applied coating will be left on the upper or hammer-blow receiving surface of the head. The wiping action may be accomplished in any of various ways, such as by drawing the fastener while still in its inverted position across a travelling fabric belt moving substantially at right angles to the direction of the fastener in moving away from the molten lead bath. It should be understood that reference to lead, where specifically named herein, is intended to include any appropriate soft metal adapted for the purposes for which the lead is used.

Figure 4:
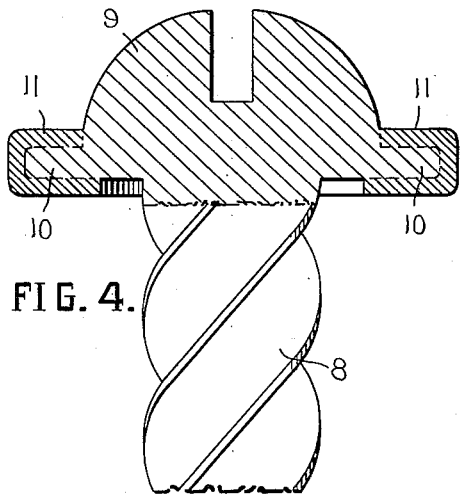

In Figure 4, the fastener is shown as a drive screw 8 having the head 9 and peripheral flange 10 on which is mounted the encircling covering or gasket 11 corresponding to gasket 6 and likewise commingled or blended with the material of the head 9 and flange 10. The same modes of production as for Figure 2 may readily be employed for the securing of the results seen in Figure 4.

Figure 5:
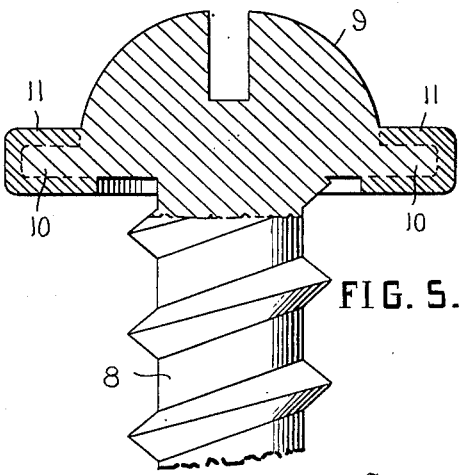

In Figure 5, the parts are identical with those seen in Figure 4 and produced in the identical manner, except that the fastener 8 is an ordinary wood screw or like high-pitched threaded fastener instead of a drive screw, so that the same reference numerals as employed in Figure 4 have been applied to Figure 5, and the description of Figure 4 will equally apply.

Figure 1:
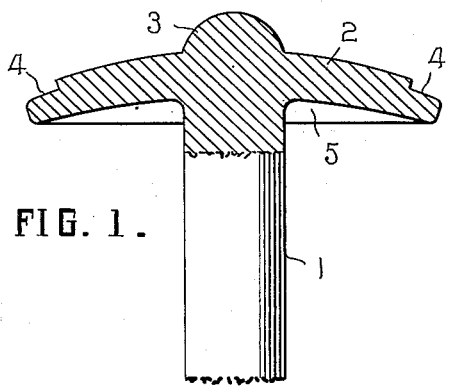
Figure 1 is a fragmentary, sectional elevation of a fastener blank well adapted for the practicing of the art and the production of the fastener head comprising the present invention.
Figure 6:
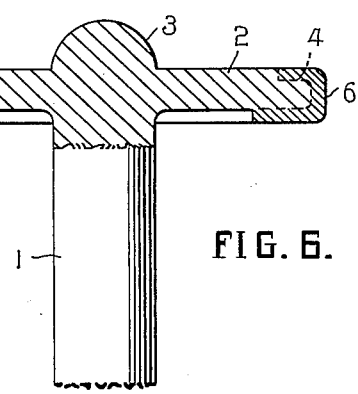

In Figure 6, the structure and modes of production are identical with those above described with respect to Figures 1 and 2, except that the head is flat instead of concavo-convex or cupped so that no enclosed area 5 appears, and, therefore, the appropriate reference numerals and description with respect to Figures 1 and 2 are employed regarding Figure 6. The flattened condition of the head 2, of course, is a matter of choice of design.

In use, when the fastener 1 is a nail, the nail is applied after the manner of any ordinary nail and driven into place until the coating or gasket 6 is firmly seated about the entire periphery of the head 2 against the surface of the cover metal which it engages. The lead or other soft metal 6, as is well known, accommodates itself to any irregularities, and, therefore, enables perfect contact with the engaged surface of the cover metal, thus rendering the joint leak-proof. The mingled or blended character of the gasket 6 with respect to the material of the head 2 precludes loosening between the gasket and head either under the force of hammer blows or under differential expansion incident to temperature variations with climatic changes. Also, the head 2 is free to be struck by a hammer without any part of the gasket 6 directly receiving the blow. Thus, a perfect leak-proof joint is produced in an easy, quick, and inexpensive manner.

The form of construction disclosed in Figure 3 enables a wider bearing surface on the cover metal and thus proportionally enlarges the margin of safety against possibility of defective contact. But this is attained at the expense of the use of a substantial additional amount of lead or like soft metal. In this connection it should be understood that the part 7 may be provided to fill the enclosing space 5 and be rendered homogeneous with the head 2 without actually extending the material about the periphery of the head as seen at 6 in Figure 3, and in that event the structure will be substantially that seen in Figure 7 which is otherwise identical with Figure 3 save the omission of the rabbet 4 and the fillet 7', so that the appropriate reference numerals from Figure 3 with the accompanying description apply equally to the showing in Figure 7.

It should be understood that the several figures of the drawing illustrate what may be properly described as magnified embodiments over those ordinarily or customarily employed in commerce, the enlargement being provided to facilitate clearness and accuracy of disclosure.

By virtue of the present invention a perfect joint is obtained free from leakage while a saving of lead or like soft metal is effected up to as high as ninety per cent. over the previously proposed embodiments in which cast and die-stamped lead coverings and lead washers were provided. This saving is effected both because the lead is applied and limited in quantity to the places only where it is required and no excess lead is needed to guard against cracking or other separation and because the lead being homogeneous with the initial soft coating and therewith or thereby commingled or blended with the balance of the head is needed in only a relatively thin layer as will become obvious when it is understood that the nail head of a popular size of nail embodying the present invention will measure approximately one-half inch in diameter, whereas Figure 2 of the drawing showing such a nail is magnified to three and one-half inches, or, in other words, the linear dimensions are increased seven-fold. The coating or gasket 6 though ample for all commercial purposes will, when reduced from the enlargement shown in the drawing to its normal dimensions, be seen to involve a relatively small amount of lead.

The fastener is well adapted for practical application exactly the same as any commercial fastener of similar type except that the result will be a leak-proof joint without the expense, labor or uncertainty of the use of a lead head or a lead washer. The application may be effected by any of the known stresses, such as the tensioning of a wire if the fastener be a headed wire, or the driving of a nail if the fastener be a nail, or the screw-driver rotation of a screw if screw threads are employed, or the hammer driving of a drive screw if that be the type of fastener. When a screw-driver is applied as to the embodiment seen in Figure 5, there is, of course, no possible danger of injury to the lead, a thing that cannot be said where a lead cap or a lead washer is employed. When hammer driving is utilized, the hammer blows are received on the iron or other metal constituting the original head of the fastener, and the impact of those blows does not tend to injure the integral lead gasket. Of course, initially applied galvanized coating is already known in commerce as capable of withstanding hammer blows.

A further advantage of the present invention is the fact that in effecting a saving in the quantity of lead required there is a proportional saving in the weight of the final fastener and this becomes an important factor in the matter of shipments of kegs or other packages where the cost of shipment depends upon the weight.

Other important advantages of the present invention will become obvious with further consideration and use of the product.

It will be understood, of course, that notwithstanding the comparative thinness of the lead cushion comprising the covering or gasket 6, the thickness thereof is ample for all cushioning purposes and for accommodating all irregularities ordinarily or customarily present to be overcome. Not only so, but, of course, the gasket or layer of lead though somewhat idealized in the showing in the drawing, may, of course, be varied in thickness to any extent required according to the particular work in mind, and whatever the thickness may be for such work, it will certainly be less than the thickness of a washer or die-stamped head applied to a fastener for the same purpose and will invariably possess the immeasurably valuable capacity to effectively function while resisting any possibility of leakage between the fastener proper and the lead coating or gasket and resisting possibility of damage of the bond between the lead and the other metal of the fastener.

The terms "blended", "mixed", "mingled" and "commingled" are used throughout this specification and appended claims as substantially synonymous, and refer to that state of the metal where at least an interlocking has occurred between two metals, as by the flowing of one in a molten state into the pores of another and bonding in the interstices of such other.

What is claimed is:—

1. The art of producing a metal fastener comprising forming a fastener with a head having a rabbet extending about its periphery and applying a soft metal cushion to the fastener including the rabbet and rendering the material of the cushion commingled with the material head of the fastener including that forming the rabbet.

2. The combination with the head of a fastener, of a cushioning gasket sweated to a condition intermingled with the material of the said head, the gasket being limited to the peripheral portions of the head and the head being formed with a peripheral rabbet in which a portion of the gasket is seated.

3. In the art of constructing fasteners, hot galvanizing a fastener and thus forming a soft coating on the fastener with material of the coating commingled with material of the fastener, supplying a portion of the fastener with a flux, dipping that portion of the head of the fastener having the flux supply into a molten soft metal bath until the soft metal becomes homogeneous with the galvanized coating of the fastener, and removing excess soft metal.

4. The art of constructing fasteners comprising dipping a portion of a heated fastener, while hot and galvanized, in a molten bath of lead until a coat is formed thereon commingled with the material of the fastener, removing the fastener from the lead bath and removing excess lead from the fastener.

5. In the art of constructing fasteners, coating portions of the head of the fastener with a covering of metal applied in a manner to penetrate the pores of the fastener head and become commingled with the penetrated material of the fastener, supplying the thus coated portions with flux, dipping the portions supplied with flux in a molten lead bath at a temperature sufficient to cause the lead to form a coating homogeneous therewith, draining the excess molten lead from the fastener, and revolving the fastener while draining.

6. In the art of constructing fasteners, coating portions of the head of the fastener with a covering of metal applied in a manner to penetrate the pores of the fastener head, supplying the thus coated portions with flux, dipping the portions supplied with flux in a molten lead bath at a temperature sufficient to cause the lead to form a coating on the first coating homogeneous therewith, and wiping excess molten lead from the fastener.

7. The method of applying and tenaciously bonding a lead enlargement to the head of a metallic fastener which comprises galvanizing the fastener to bond thereto a coating having an affinity for lead, and building the complete lead enlargement on the coated fastener solely by placing the coated fastener in contact with molten lead to cause an intimate bond to be formed between the fastener and the enlargement dependent upon the affinity of the lead and the coating.

8. The method of applying and tenaciously bonding a lead enlargement to the head of a metallic fastener which comprises providing the fastener with an intimately bonded coating composed of a material having an affinity for lead, and building the complete lead enlargement on the coating solely by contact of the coated fastener with molten lead to cause the enlargement to be intimately bonded to the coating solely by the affinity of the lead for the coating.

HEYMAN ROSENBERG.